(12) United States Patent
Guilford (10) Patent No.: US 10,496,709 B2
(45) Date of Patent: *Dec. 3, 2019

(54) SYSTEMS, METHODS AND PROGRAM INSTRUCTIONS FOR CALLING A DATABASE FUNCTION WITH A URL

(71) Applicant: Steven Guilford, Los Angeles, CA (US)

(72) Inventor: Steven Guilford, Los Angeles, CA (US)

(73) Assignee: AsterionDB, Inc., Irvine, CA (US)

( * ) Notice: Subject to any disclaimer, the term of this patent is extended or adjusted under 35 U.S.C. 154(b) by 928 days.

This patent is subject to a terminal disclaimer.

(21) Appl. No.: 14/504,382

(22) Filed: Oct. 1, 2014

(65) Prior Publication Data

US 2015/0095371 A1 Apr. 2, 2015

Related U.S. Application Data

(60) Provisional application No. 61/885,317, filed on Oct. 1, 2013.

(51) Int. Cl.
*G06F 7/02* (2006.01)
*G06F 16/00* (2019.01)
(Continued)

(52) U.S. Cl.
CPC .......... *G06F 16/951* (2019.01); *G06F 16/24* (2019.01); *G06F 16/252* (2019.01); *G06F 16/957* (2019.01); *G06F 16/9566* (2019.01); *G06F 16/972* (2019.01); *H04L 65/4084* (2013.01); *H04L 65/60* (2013.01); *H04N 21/2393* (2013.01); *H04N 21/47202* (2013.01); *H04N 21/6175* (2013.01); *H04N 21/6581* (2013.01); *H04N 21/6582* (2013.01); *H04L 67/02* (2013.01)

(58) Field of Classification Search
CPC ......... G06F 17/30887; G06F 17/30864; G06F 17/30861; G06F 17/30386; G06F 17/30017; G06F 17/3056; G06F 17/30893; G06F 17/30899; G06F 17/30; G06F 16/9566; G06F 16/951; G06F 16/95; G06F 16/24; G06F 16/40; G06F 16/252; G06F 16/972; G06F 16/957; G06F 16/00

See application file for complete search history.

(56) References Cited

U.S. PATENT DOCUMENTS 7,293,012 B1 * 11/2007 Solaro ............... G06F 17/30864
8,762,299 B1 * 6/2014 Breckenridge ......... G06F 15/18
706/12

(Continued)

*Primary Examiner* — Bruce M Moser
(74) *Attorney, Agent, or Firm* — Bryan Fibel (57) ABSTRACT

Systems, methods and program instructions are described for calling a database function with a URL. Many databases have functions, also referred to as logical elements, built into the database that can be called to retrieve data. A web URL can be used to call such a programming function by formatting the URL in a specific manner. After the URL is received, it can be parsed to determine the resource path and parameters, if any exist. The database function specified in the URL is called using the specified parameters, if any exist. The results can be interpreted and an appropriate response can be streamed.

9 Claims, 8 Drawing Sheets

(51) Int. Cl.
　　　*G06F 16/951*　　　(2019.01)
　　　*H04L 29/06*　　　(2006.01)
　　　*G06F 16/24*　　　(2019.01)
　　　*G06F 16/25*　　　(2019.01)
　　　*G06F 16/957*　　　(2019.01)
　　　*G06F 16/958*　　　(2019.01)
　　　*G06F 16/955*　　　(2019.01)
　　　*H04N 21/239*　　　(2011.01)
　　　*H04N 21/472*　　　(2011.01)
　　　*H04N 21/61*　　　(2011.01)
　　　*H04N 21/658*　　　(2011.01)
　　　*H04L 29/08*　　　(2006.01)

(56) References Cited

U.S. PATENT DOCUMENTS

| | | | | |
|---|---|---|---|---|
| 2002/0114318 | A1* | 8/2002 | Rines | H04M 7/006 370/352 |
| 2003/0037069 | A1* | 2/2003 | Davison | G06F 17/2247 |
| 2009/0172197 | A1* | 7/2009 | Kalaboukis | G06F 16/955 709/246 |
| 2009/0305675 | A1* | 12/2009 | Mueller | H04L 51/066 455/412.1 |
| 2012/0331372 | A1* | 12/2012 | Scoda | H04L 67/02 715/206 |
| 2013/0159530 | A1* | 6/2013 | James | G06F 17/30887 709/226 |
| 2013/0226991 | A1* | 8/2013 | Isaacs | H04L 67/02 709/203 |
| 2014/0115708 | A1* | 4/2014 | Terwilliger | G06F 21/36 726/26 |
| 2016/0196484 | A1* | 7/2016 | Ciavatta | G06F 17/30879 235/462.1 |

* cited by examiner

```
┌─────────────────────────┐  405
│ Retrieve description of │
│ object from the database│
└───────────┬─────────────┘
            │
            ▼
┌─────────────────────────┐  410
│ Iterate through items   │
│ in object to find the   │
│ required item           │
└───────────┬─────────────┘
            │
            ▼
          415
         ╱╲
        ╱  ╲           ┌──────────────────────────┐  420
       ╱Was ╲    No    │ Return an error indicating│
      ╱correct╲───────▶│ that an invalid return-type│
      ╲ item  ╱        │ object has been used.     │
       ╲found?╱        └──────────────────────────┘
        ╲  ╱
         ╲╱
          │ Yes
          ▼
┌─────────────────────────┐  425
│ Bind an appropriate     │
│ variable to receive the │
│ desired value.          │
└─────────────────────────┘
```

SYSTEMS, METHODS AND PROGRAM INSTRUCTIONS FOR CALLING A DATABASE FUNCTION WITH A URL

CROSS REFERENCE TO RELATED APPLICATIONS

This application claims priority from a provisional U.S. patent application No. 61/885,317 filed on Oct. 1, 2013.

FIELD OF THE INVENTION

Embodiments of the invention generally relate to applications used in retrieval of data from a database. Specifically, embodiments of the invention relate to tying a URL to a function in the database.

BACKGROUND OF THE INVENTION

A database is a collection of data stored in a digital form. Databases have become an integral part of virtually all business and personal applications. A database can store different types of data ranging from personal identification information to various forms of multimedia. Additionally, a database can also contain types of code, referred to as logical elements, which assist in the retrieval and manipulation of data. A computer program can execute functions to return data based on a request from a user. The data can then be displayed to the user.

A uniform resource locator ("URL") is a character string that serves as a reference to a resource. URLs allow a user to access data using a World Wide Web ("Web") browser across a local area or wide area network, such as the Internet.

SUMMARY

Data of varying types can be organized securely in a database. The present invention satisfies a need to access resources in a database using a URL. Many databases have functions, also referred to as logical elements, built into the database that can be called to retrieve data. A web URL can be used to call such a programming function by formatting the URL in a specific manner.

In accordance with the teachings of the present invention, systems, methods and program instructions are provided for calling a database function with a URL. The invention provides for receiving a URL request for data. The URL is parsed to determine the function and, if they exist, parameters. A call is made to the database function specified in the URL and, if they exist, with parameters specified in the URL.

Additionally, after parsing the after parsing the URL, the function specified by the resource path can be validated to determine that it is a logical element within the database. If it is not a valid logical element, an error can be returned to the user. Additionally, after making the function call the results can be interpreted and a response can be streamed to the user.

The parameters specified in the URL can be singular values that will be assigned to the function parameters in sequence. Alternatively, the parameters specified in the URL can be designated by a key and the values will be assigned to the function parameters matching the key

BRIEF DESCRIPTION OF THE DRAWINGS

The accompanying drawings taken in conjunction with the detailed description will assist in making the advantages and aspects of the disclosure more apparent.

DETAILED DESCRIPTION

Reference will now be made in detail to the present embodiments discussed herein, illustrated in the accompanying drawings. The embodiments are described below to explain the disclosed method by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate.

The subject matter is presented in the general context of program modules that are able to receive URL requests and interface with a database. Those skilled in the art will recognize that other implementations may be performed in combination with other type of program modules that may include different data structures, components, or routines that perform similar tasks. The invention can be practiced using various computer system configurations, such as client server systems. Other usable systems can include, but are not limited to, mainframe computers, microprocessors, personal computers, smart phones, tablets, and other consumer electronic devices. Such computer devices may include one or more processors, memory (hard disk, random access memory, cache memory, etc.), an operating system, and a database.

Systems, methods and computer program products for calling a function in the database, which returns data, using a URL is provided. Such an invention allows a user to use a simply constructed URL on a web page to retrieve data directly from the database. Benefits of this invention include security and consistency, since data is contained within the database. Instead of files located in a file folder hierarchy, data can be organized in a database for easy retrieval. Retrievable datatypes may include BLOBs (binary large objects), which are often multimedia data, and CLOBs (character large objects), which can be character text. An explanation of tying a URL to logic in the database follows.

A piece of computer code that returns a value is referred to as a function. Many databases have functions, also referred to as logical elements, built into the database. Such logic within the database can be organized into standalone logical elements, such as individual functions and procedures, or collections of associated logical elements, such as functions and procedures that are contained within a package. Databases with these built-in functions are referred to as logically enabled databases. There are databases lacking such logic, but one, who is skilled in the art, could add the same functionality to a database to convert it to a logically enabled database in order for the invention to be performed. For the purpose of this invention a function that returns data from the database is required.

A web URL can be used to call such a programming function by formatting the URL in a specific manner. Using a typical URL, http://www.example.com, a resource path can be appended to the basic URL with the addition of a third '/' character: http://www.example.com/function.

URL parameters can be added to refer to parameters in a function call. Parameters in the URL can be specified as a "key=value" tuple. In this format, it is evident what value is assigned to what parameter. For example, the two additional parameters, param1 with a value of 'foo' and param2 with the value of 'bar', can be added to the original example URL as: http://www.example.com/function?param1=foo&param2=bar.

Alternatively, parameters in the URL can be specified as a singular "value". In this format, the order of the parameters determines which parameter has what value. For example, the two additional parameters, param1 with a value of foo and param2 with the value of bar, can be added to the original example URL as: http://www.example.com/function?foo&bar.

Regardless of how the URL is constructed, as long as it adheres to general URL formatting requirements, it is only necessary that the function name and any parameters can be identified from the URL.

Figure 1:
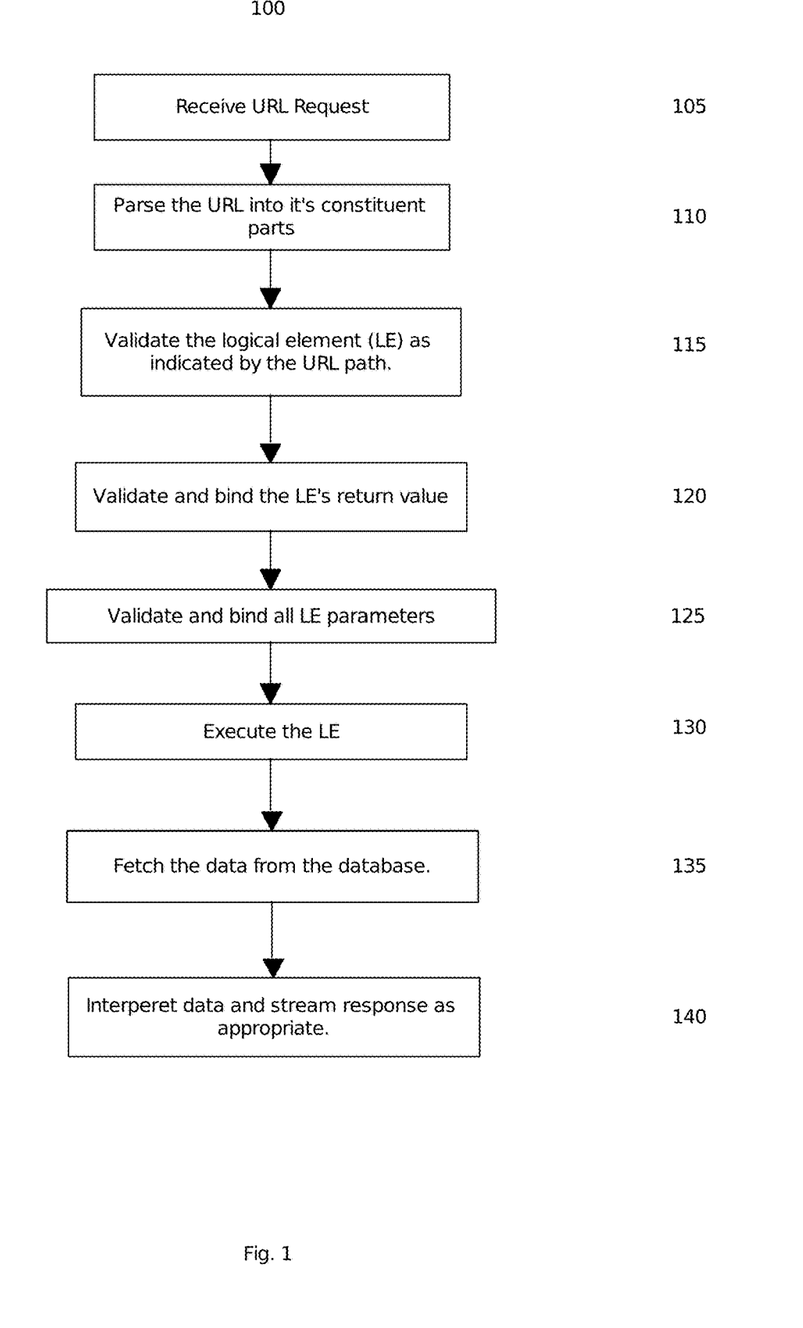
FIG. 1 is a flow chart showing a general overview of how a URL is used to call a function in the database.

As illustrated in FIG. 1, a flow chart 100, showing a general overview of how a URL is used to retrieve data from a database, is provided.

Once assembled, the URL can be placed on a webpage to access data in the database. The request for data is received by the server in the form of the encoded URL 105. Often this will be a URL request from a web client to a resource server.

The URL is separated into its constituent parts, the resource path and the parameters 110. In the preferred embodiment, the resource path appears after the http://www.example.com as delineated by the third '/' character. Any parameters appearing after the '?' character can then be parsed and counted using the '&' delimiter.

Once identified, the resource path can be validated as a logical element within the database 115. The resource path is determined to be one of the following:
a function within the server's database context,
a function within a foreign context in database,
a function within a package contained in the server's database context
or a function within a package contained in a foreign context in the database.

The function's return value is examined for datatype validation 120. The function can return either a single datatype or an object containing a collection of datatypes. If the object contains more than one datatype, then the first datatype that matches the desired datatype is used for the return value. Alternatively, if the object contains more than one datatype, a parameter can indicate which one will be used for the return value.

The parameters are validated and assigned values corresponding to the URL parameters 125. The parameters can be easily identified as "key=value" tuples or singular "values." If the parameters are "key=value" tuples, then the passed parameters are matched based on their corresponding "key".

If the parameters are in the singular "value" format, then the order of the parameters in the URL determines how the values are set.

The logical element can then be executed 130 to fetch the data 135. If the function fails, an error can be reported. If successful, the resource server interprets the results and streams an appropriate response 140. The response can be an acknowledgement that the data was retrieved successfully or the data itself. The server can stream the data immediately or it can be programmed to first perform any necessary actions on the data first before it streams the result to the client.

At various steps in the present embodiment, the URL content is validated in order to determine if the process can be successfully completed. These validation checks are in place because the URL can be placed on a webpage by any user who has little understanding beyond simple URL construction. They add safeguards against bad user input in such an embodiment. Other embodiments may include more or less validation logic.

After successful validation, the program will proceed to bind variables for the return value and parameters. Binding indicates to the database where to assign the variable and is a term known to those skilled in the art.

Figure 2:
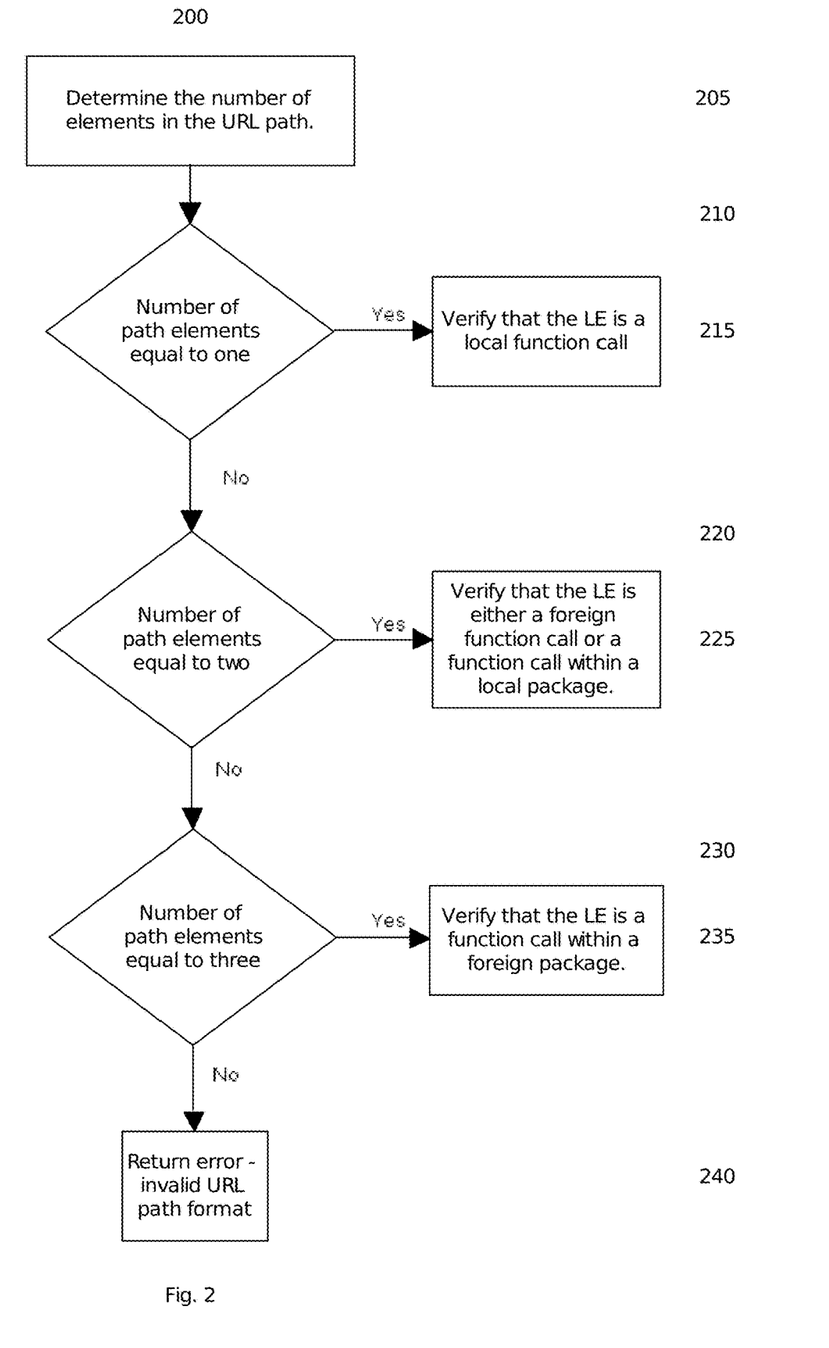
FIG. 2 is a flow chart showing how the logical element, as indicated by the URL path, is validated.

Expanding on 115, as illustrated in FIG. 2, a flow chart 200 showing how the logical element is validated is provided.

The elements in the URL resource path determine the type of logical element. The resource path is examined to determine the number of elements in the resource path 205. The elements can be parsed and counted using the '/' delimiter. If the number of elements in the URL resource path is equal to one 210, the logical element is verified to be a local function call (http://www.example.com/function) 215. If the number of elements in the URL resource path is equal to two 220, the logical element is verified to be a function call within a foreign context of the database (http://www.example.com/databasecontext/function) or a function call within a local package (http://www.example.com/package/function) 225. If the number of elements in the URL resource path is equal to three 230, the logical element is verified to be a function call within package contained in a foreign context in the database (http://www.example.com/databasecontext/package/function) 235. If the resource path elements do not match any of the possible logical elements, then an error for an invalid resource path is reported 240.

Figure 3:
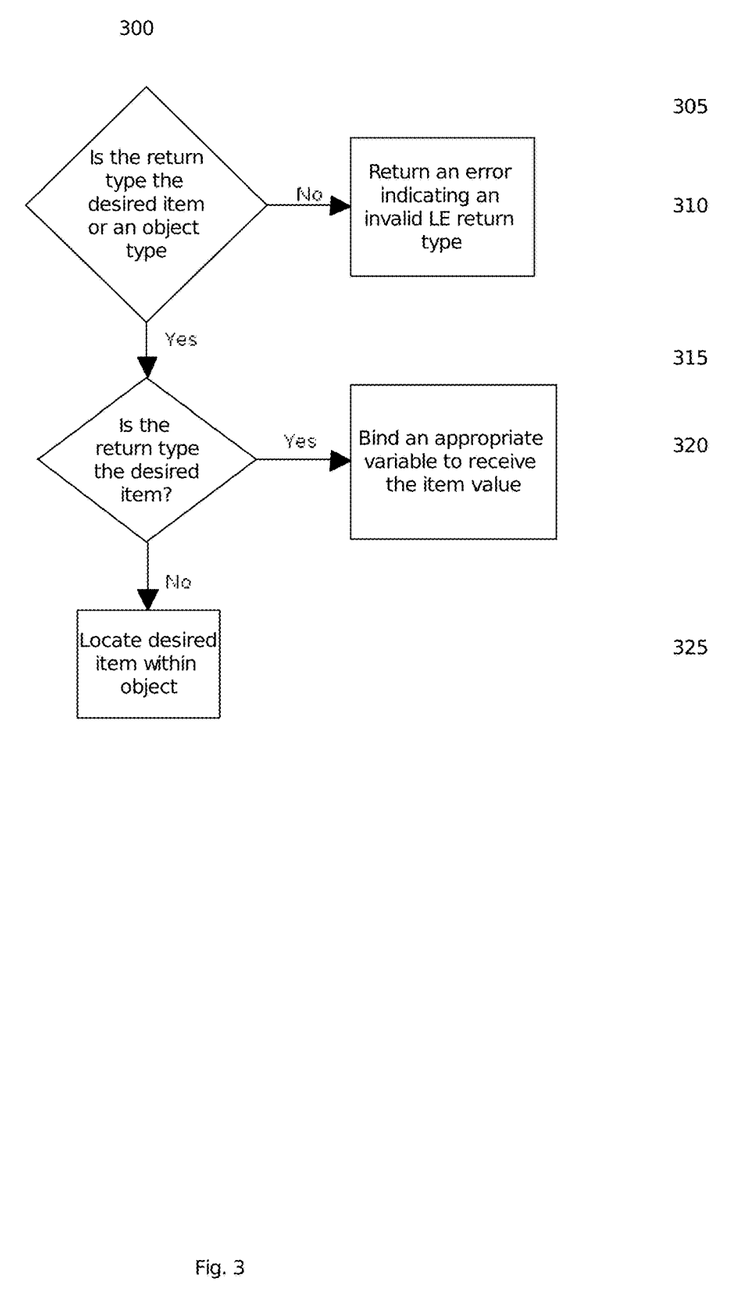
FIG. 3 is a flow chart showing how the logical element's return value is validated.

Expanding on 120, as illustrated in FIG. 3, a flow chart 300 showing how the logical element's return value is validated is provided.

It is necessary to determine that the logical element returns either the desired datatype or an object which contains multiple datatypes 305. If it is neither, then an error for an invalid return datatype reported 310. If the return type is the desired datatype 315, then an appropriate variable is bound to receive the value 320. If the return type is an object which is a collection of datatypes, the datatype can be located within the object 325.

Figure 4:
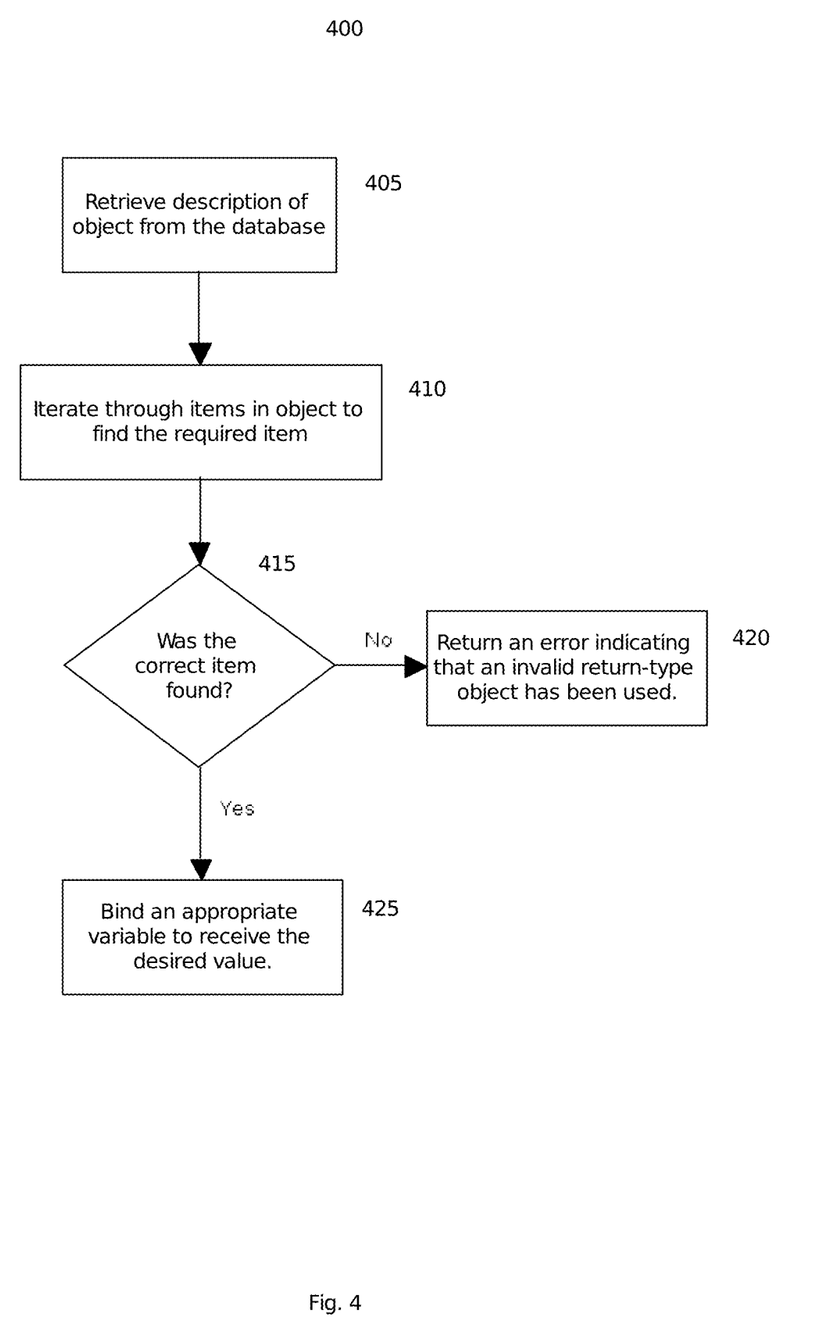
FIG. 4 is a flow chart showing how the return value datatype is located within an object that is a collection of datatypes.

Expanding on 325, as illustrated in FIG. 4, a flow chart 400 showing how a datatype is located within an object that is a collection of datatypes is provided.

A description of the return object can be retrieved from the database 405. In the present embodiment, the first datatype that matches the desired datatype contains the return value. The first datatype can be found by iterating through the collection of datatypes in the object 410. If the correct item is not found 415, an appropriate error that an invalid return type object has been used is reported 420.

Once the first item is found 415, then an appropriate variable is bound to receive the value 425.

Figure 5:
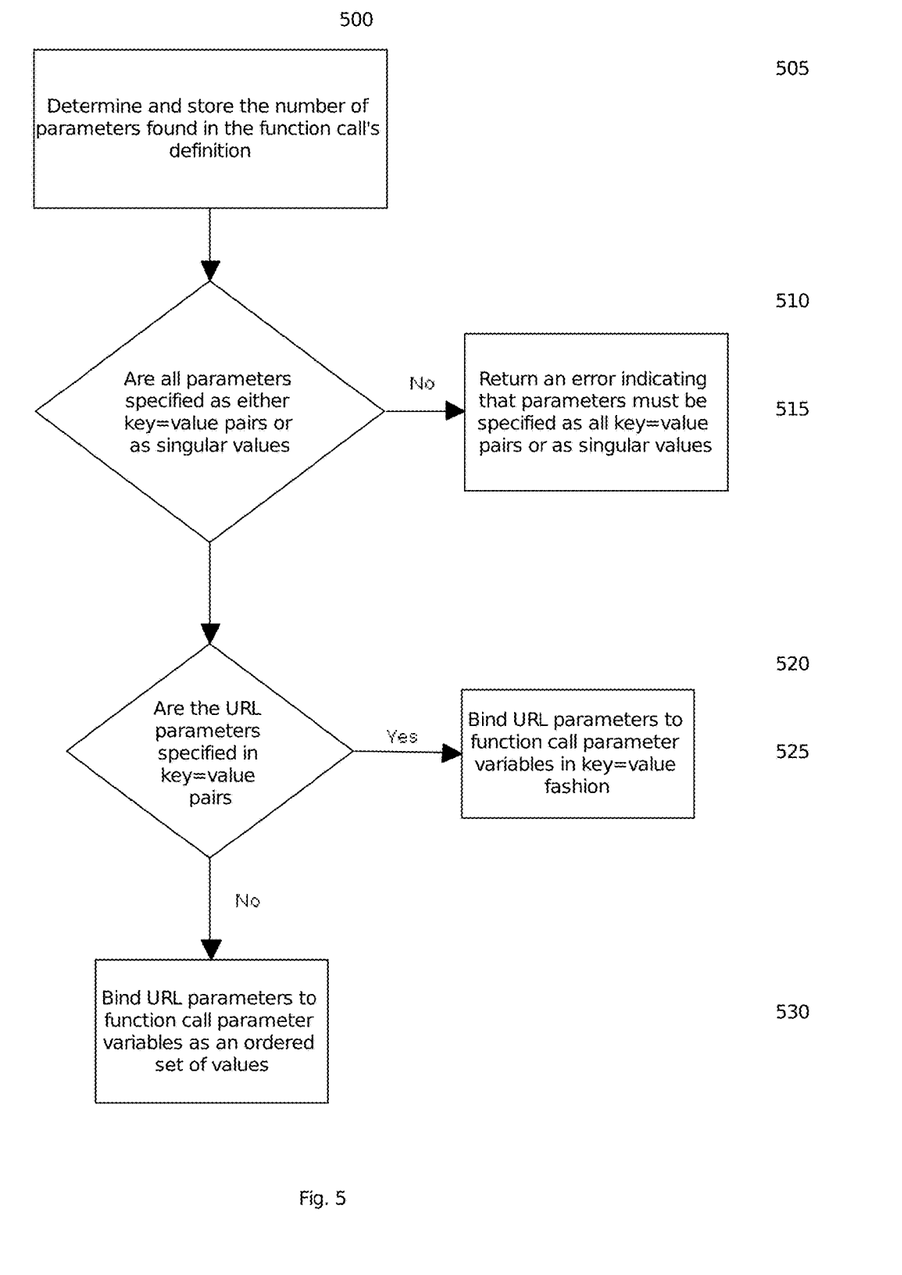
FIG. 5 is a flow chart showing how the logical element's parameters are validated and assigned is provided.

Expanding on 125, as illustrated in FIG. 5, a flowchart 500 showing how the logical element's parameters are validated and assigned is provided.

The number of parameters found in a function's definition can be determined to establish a parameter count 505. This count will be used in validating and setting parameters from the URL. The parameters from the resource path can be easily identified as "key=value" tuples (by checking for the existence of '=' characters) or singular values. It is necessary that all parameters be specified in the same format as "key=value" pairs or as singular values 510. If not, then an error indicating that all parameters be specified as "key=value" pairs or as singular values is reported 515. If the parameters are in the "key=value" format 520, then the URL parameter values are assigned to the function call parameters by matching the 'keys' 525. Any parameters in the function without a corresponding match are not assigned a value. Otherwise, the parameters are in the singular "value" format and will be set according to the order they appear in 530. If all of the parameters are in the singular "value" format, then the count of passed parameters is validated to be greater than or equal to the number of parameters in the function.

Figure 6:
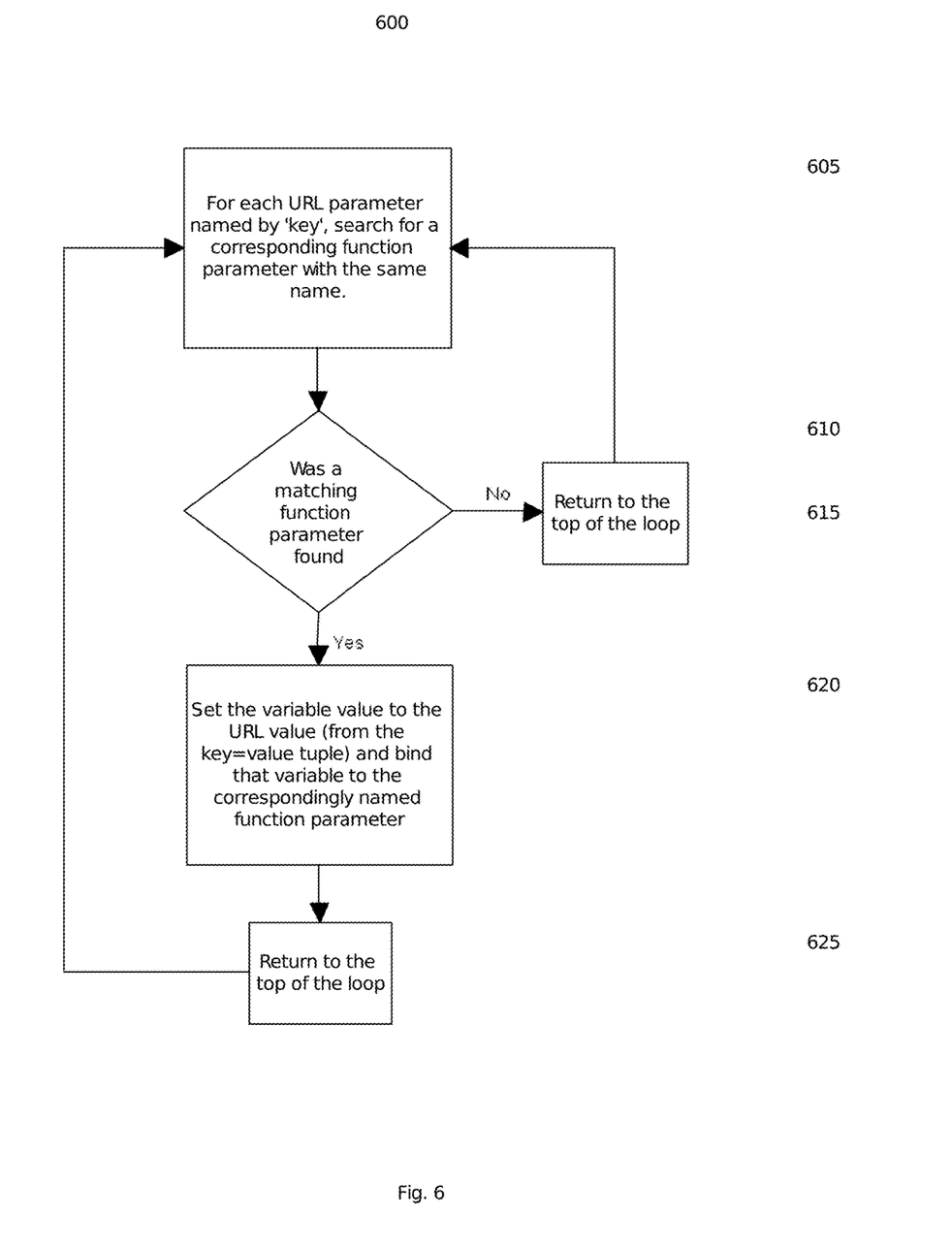
FIG. 6 is a flow chart showing how the URL parameters are assigned to the function call parameter variables in the "key=value" format.

Expanding on 515, as illustrated in FIG. 6, a flowchart 600 showing how the URL parameters are assigned to the function parameter variables in the "key=value" format is provided.

For each URL parameter named by "key", a matching function parameter can be found by iterating through the function parameters 605. If a matching function parameter is not found 610, then, return to the top of the loop and continue with the next URL parameter 615. If a matching parameter is found 810, then set a variable value to the URL value, from the "key=value" tuple, and bind the variable to the correspondingly named function parameter 620. Afterwards, return to the top of the loop and continue with the next URL parameter 625.

Figure 7:
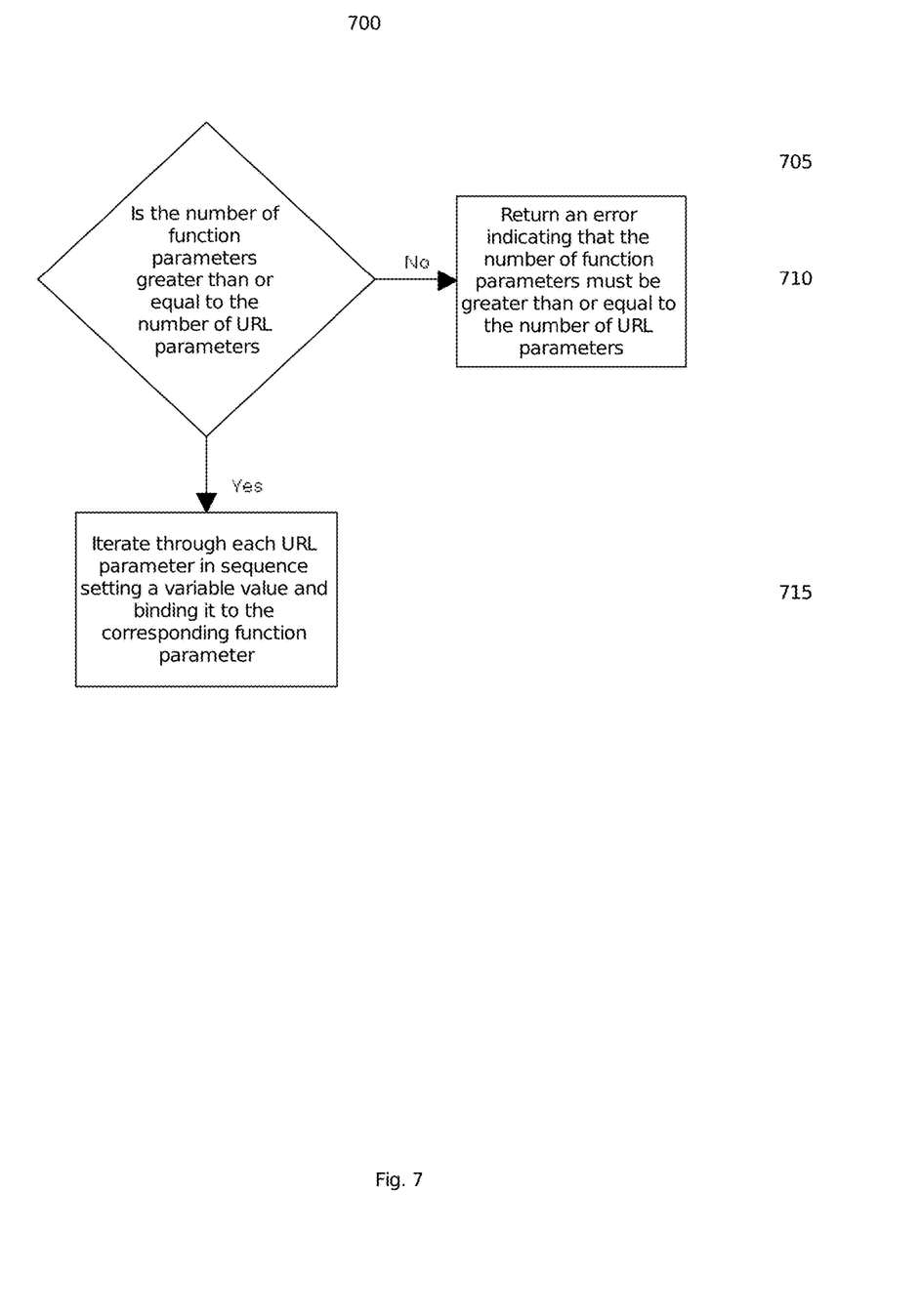
FIG. 7 is a flow chart showing how the URL parameters are assigned to the function call parameter variables in the singular "value" format.

Expanding on 720, as illustrated in FIG. 7, a flowchart 700 showing how the URL parameters are assigned to the function parameter variables in the singular "value" format is provided.

If the URL parameters are in the singular "value" format, the number of URL parameters is determined. The number of function parameters is validated to be greater than or equal to the number URL parameters 705. If this is not the case, then, an error indicating that number of function parameters should be greater than or equal to the number of URL parameters is reported 710. If the number of parameter numbers passes validation, then, it is possible to iterate through each URL parameter in sequence setting a variable value and binding it to the corresponding function parameter 715.

The function can then be executed to retrieve the data from the database. Such a function may be, as an example, a general retrieval function, (specified in the URL) that takes as parameters an asset ID (specified in the URL). The function can query the database for a data asset with a key ID equal to the specified ID. If a data asset is successfully retrieved, it can be acted upon by the web server or even streamed to a requesting web client.

Figure 8:
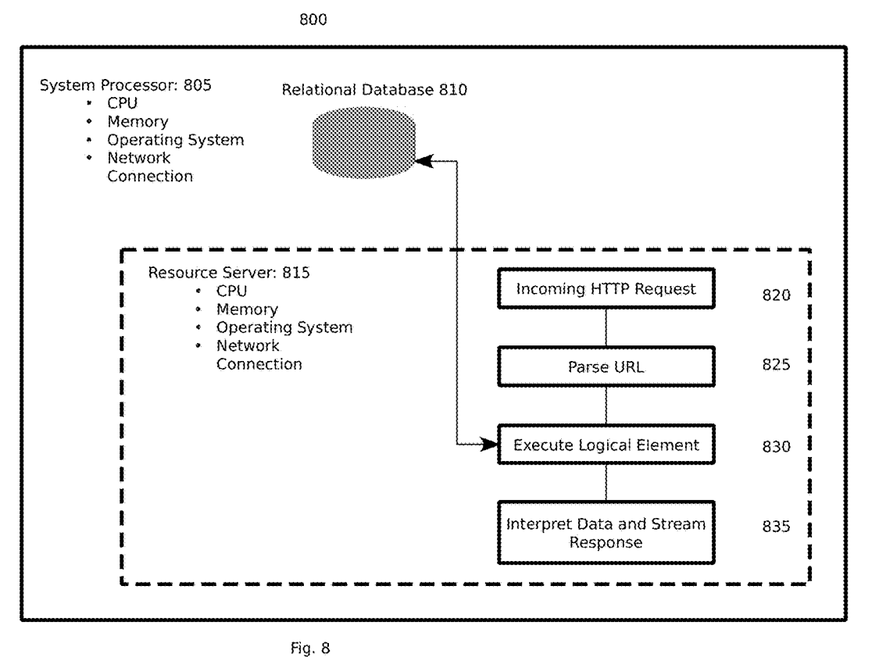
FIG. 8 is a block diagram of a general system embodiment

As illustrated in FIG. 8, a block diagram 800 of a general system embodiment is provided.

A general system embodiment on a computer is presented. In the depicted embodiment, there exists a system processor 805 and a resource server 815. Some components of the computer include a CPU, memory (hard disk, random access memory cache memory, etc.), an operating system, network connection, and a relational database 810. The resource processor receives an incoming HTTP request for data 820. It then parses the URL to determine the resource path and parameters, if any exist 825. Once identified, the logical element is executed 830. The resulting data is interpreted and an appropriate response can be streamed back to the user 835. In a variation of this system, a single processor on a computer performs all tasks. In another embodiment, any number of resource servers on separate computers can access the system processor containing the database.

The preceding description contains various embodiments of the invention and no limitation of the scope is thereby intended.

That which is claimed is:

1. A method comprising:
   receiving a URL request for data from a web client;
   parsing the URL, by one or more HTML compliant delimiters, to determine, by number of HTML compliant delimiters, a database function within a database, database package, and/or database context and any parameters;
   validating the database function to determine that it is a logical element within the database, database package, and/or database context;
   validating the database function to determine that the database function returns either a datatype desired by the request for data or an object that contains multiple datatypes where at least one datatype is the datatype desired by the request for data;
   executing the database function within the database, database package, and/or database context specified in the URL and with any parameters specified in the URL;
   interpreting retrieved data and streaming a response to the web client.

2. The method of claim 1, wherein if it is determined that the database function returns an object that contains multiple datatypes where at least one datatype is the datatype desired by the request for data, the first will be used for a return value;
   otherwise, if it is determined that the database function returns the datatype desired by the request for data, an appropriate variable will be used for a return value.

3. The method of claim 1, wherein if it is determined that the database function returns an object that contains multiple datatypes where at least one datatype is the datatype desired by the request for data, a parameter indicates which will be used for a return value;
   otherwise, if it is determined that the database function returns the datatype desired by the request for data, an appropriate variable will be used for a return value.

4. A system comprising at least one processor, the at least one processor configured to cause the system to at least perform:
   receiving a URL request for data from a web client;
   parsing the URL, by one or more HTML compliant delimiters, to determine, by number of HTML compliant delimiters, a database function in a database, database package, and/or database context and any parameters;
   validating the database function to determine that it is a logical element in the database, database package, and/or database context;
   validating the database function to determine that the database function returns either a datatype desired by the request for data or an object that contains multiple datatypes where at least one datatype is the datatype desired by the request for data;

executing the database function in the database, database package, and/or database context specified in the URL and with any parameters specified in the URL;

interpreting retrieved data and streaming a response to the web client.

5. The system of claim 4, wherein if it is determined that the database function returns an object that contains multiple datatypes where at least one datatype is the datatype desired by the request for data, the first will be used for a return value;

otherwise, if it is determined that the database function returns the datatype desired by the request for data, an appropriate variable will be used for a return value.

6. The system of claim 4, wherein if it is determined that the database function returns an object that contains multiple datatypes where at least one datatype is the datatype desired by the request for data, a parameter indicates which will be used for a return value;

otherwise, if it is determined that the database function returns the datatype desired by the request for data, an appropriate variable will be used for a return value.

7. A non-transitory computer-readable medium for use in a computer system and holding computer-executable instructions comprising:

receiving a URL request for data from a web client;

parsing the URL, by one or more HTML compliant delimiters, to determine, by number of HTML compliant delimiters, a database function in a database, database package, and/or database context and any parameters;

validating the database function to determine that it is a logical element in the database, database package, and/or database context;

validating the database function to determine that the database function returns either a datatype desired by the request for data or an object that contains multiple datatypes where at least one datatype is the datatype desired by the request for data;

executing the database function in the database, database package, and/or database context specified in the URL and with any parameters specified in the URL;

interpreting retrieved data and streaming a response to the web client.

8. The non-transitory computer-readable medium of claim 7, wherein if it is determined that the database function returns an object that contains multiple datatypes where at least one datatype is the datatype desired by the request for data, the first will be used for a return value;

otherwise, if it is determined that the database function returns the datatype desired by the request for data, an appropriate variable will be used for a return value.

9. The non-transitory computer-readable medium of claim 7, wherein if it is determined that the database function returns an object that contains multiple datatypes where at least one datatype is the datatype desired by the request for data, a parameter indicates which will be used for a return value;

otherwise, if it is determined that the database function returns the datatype desired by the request for data, an appropriate variable will be used for a return value.

* * * * *